July 2, 1957 E. F. G. GARNIER 2,797,861
MECHANICAL DEVICE FOR DETERMINING THE POSITION OF A MOVING
BODY RELATIVELY TO A POLAR CO-ORDINATE SYSTEM
Filed May 4, 1951 4 Sheets-Sheet 1

Inventor
Eugène François Gilbert Garnier
By:
Haseltine, Lake & Co.
Agents

July 2, 1957 E. F. G. GARNIER 2,797,861
MECHANICAL DEVICE FOR DETERMINING THE POSITION OF A MOVING
BODY RELATIVELY TO A POLAR CO-ORDINATE SYSTEM
Filed May 4, 1951 4 Sheets-Sheet 2
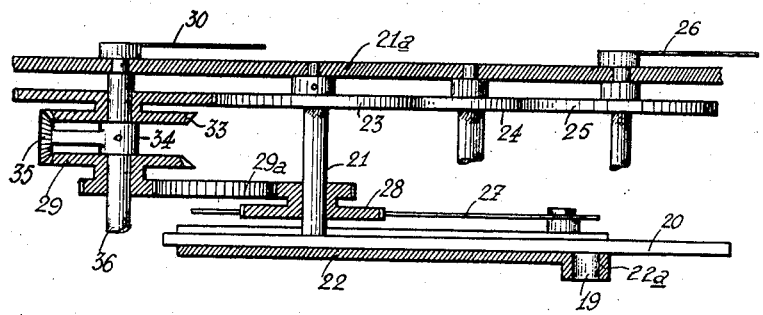
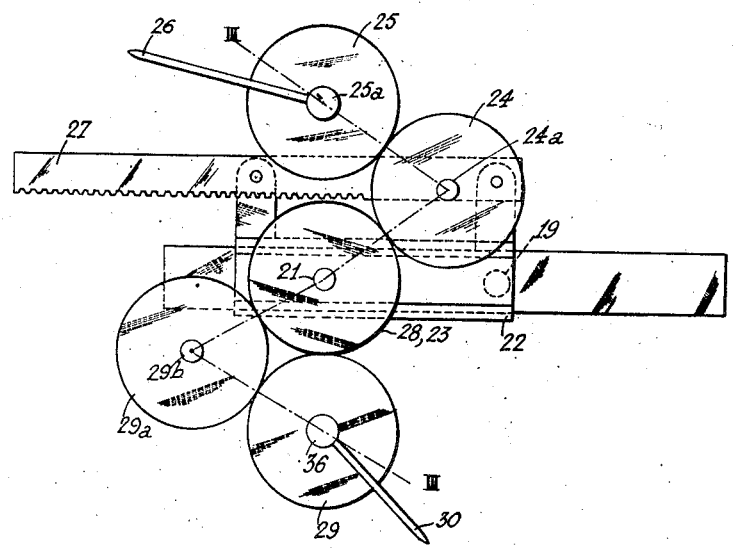

July 2, 1957  E. F. G. GARNIER  2,797,861
MECHANICAL DEVICE FOR DETERMINING THE POSITION OF A MOVING
BODY RELATIVELY TO A POLAR CO-ORDINATE SYSTEM
Filed May 4, 1951  4 Sheets-Sheet 3

INVENTOR
EUGENE FRANCOIS GILBERT GARNIER
By:
Hazeltine, Lake & Co.
AGENTS

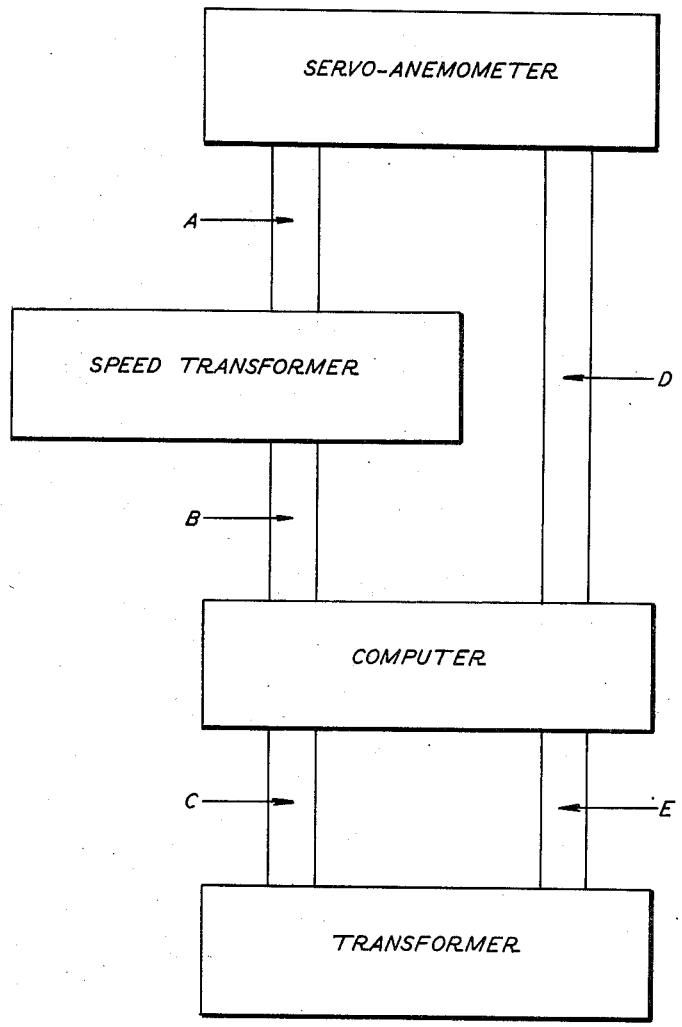

United States Patent Office 2,797,861
Patented July 2, 1957

2,797,861

MECHANICAL DEVICE FOR DETERMINING THE POSITION OF A MOVING BODY RELATIVELY TO A POLAR CO-ORDINATE SYSTEM

Eugéne François Gilbert Garnier, Nice, France

Application May 4, 1951, Serial No. 224,562

Claims priority, application France May 8, 1950

6 Claims. (Cl. 235—61)

This invention relates to a mechanical device adapted to determine the position of a moving body relatively to a plane polar co-ordinate system, such as used in maritime or air navigation in determining the position of a ship or an aircraft with respect to this system having its center coincident with the initial base line and as origin of the azimuths the northern direction.

Although the device according to this invention is suitable for determining the position of a moving body of any description, it is particularly adapted however for use on interceptor-fighters or similar aircraft. As a matter of fact, airplanes of this type are frequently flown along very steep courses and to high altitudes. Therefore, it is the horizontal component of their speed and not this speed proper that must be taken as one of the basic values in determining the position through bearings. Besides, experience has proved that in view of the specific conditions of use of these airplanes it is preferable to determine their positions by relying upon plane polar co-ordinates.

It is therefore the essential object of this invention to provide means for determining the plane polar co-ordinates of a moving body, in a system of given co-ordinates, by measuring the real speed of this moving body in relation to air, finding the horizontal component of this relative speed, computing the orthogonal components of the resultant of this horizontal speed of the body and of the wind speed in a two-co-ordinate reference system, and by transforming these orthogonal co-ordinates into polar co-ordinates in the selected system of plane polar co-ordinates.

It is another object of this invention to provide means for measuring the horizontal speed of a moving body by multiplying the tangential speed of this moving body relative to the air by the cosine of any angle whatever and causing this angle, according to the vertical component of this tangential speed, to coincide with the angle made by this tangential speed with the horizontal plane.

Another object of this invention is to provide, in a device of the type broadly described above, a mechanism for converting two orthogonal co-ordinates of a moving body into plane polar co-ordinates, wherein the latter are reckoned as a function of the position relative to a fixed center pertaining to a reference plane, of the projection of one point of a member subjected, in a plane parallel with this reference plane, to two orthogonal movements at speeds respectively proportional to the projections on the orthogonal axes of the resultant of the speeds of the moving body on the one hand and of the wind on the other hand.

The mechanical device contemplated in this invention comprises a servo-anemometer adapted to produce a movement having a velocity proportional to the tangential speed V of the moving body relative to the air, a speed transformer actuated at this velocity proportional to V and producing a movement with a speed proportional to $V_H$ which is the horizontal component of V, a computer for the orthogonal components of the resultant of this output speed proportoinal to $V_H$ and the wind speed, and a transformer for converting these orthogonal co-ordinates into polar co-ordinates.

Preferably, the servo-anemometer is similar to that described in the U. S. Patent No. 2,537,580 of January 9, 1951, to same applicant for "Servo-Anemometer," the computer of orthogonal co-ordinates being of the type described in the U. S. Patent No. 2,507,567 of May 16, 1950, to same applicant for "Mechanical Computer for determining the Position of a Moving Body Relatively to a Two-Co-ordinate Rerference System."

According to a preferred and advantageous embodiment of this invention the speed transformer producing a movement proportional to the horizontal component of the tangential velocity of the moving body comprises a driving sphere rotating about a diametral axis at a speed proportional to the instantaneous velocity V of the moving body and adapted to drive a pair of tangent roller wheels rotating about axes perpendicular to each other and situated in a common plane with the axis of rotation of the sphere, means for varying the angle between this axis and the axis of rotation of one of the aforesaid roller wheels, and means for so adjusting the magnitude of this angle that one of the roller wheels will rotate at a speed proportional with the vertical speed of the moving body while the other rotates simultaneously at a speed proportional with the horizontal speed to be determined.

The device for transforming the two orthogonal co-ordinates into plane polar co-ordinates comprises, according to a preferred and advantageous embodiment of the invention, an alidade the fixed axis of rotation of which represents the origin of the co-ordinates, a slider movable on the alidade and pivotally mounted on a member subjected simultaneously to both orthogonal movements from the computer of orthogonal co-ordinates, whereby this alidade is constantly oriented towards the azimuth $\omega$ of the position of the movable body, the distance $\rho$ covered by the slider on the alidade representing, at the selected scale, the distance of the moving body from its starting point.

The affixed drawings forming part of this specification are given by way of diagrammatical example in order to afford a clearer understanding of the various objects of the invention as broadly set forth above and of the manner in which the same may be carried out. In the drawings:

Fig. 2 is a plane view at a larger scale showing the alidade device wtih its associated members.

Fig. 3 is a cross-section along the lines 36, 29b, 21 24a and 25a of Fig. 2.

Fig. 7 is a diagram of a complete system in accordance with the invention.

Figure 1:
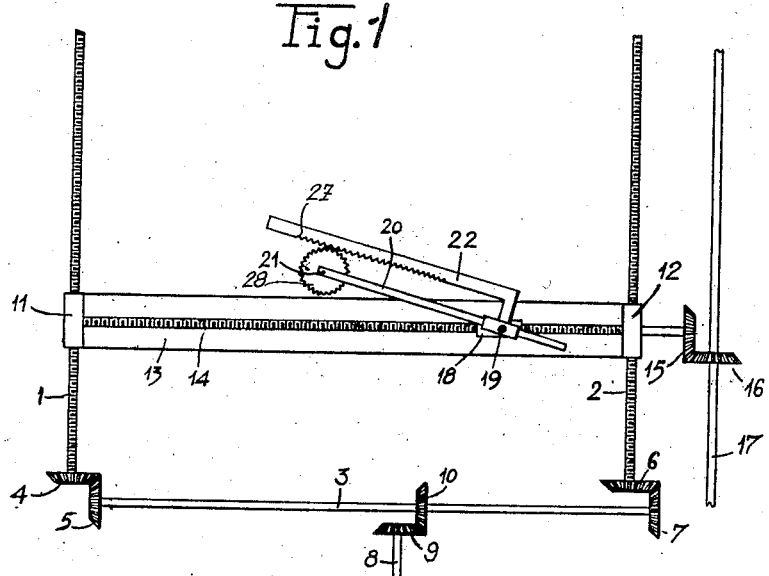
Fig. 1 is a diagrammatical illustration of the co-ordinate transformer according to this invention.

As illustrated in Fig. 1, the two co-ordinate transformer comprises a pair of parallel screw rods 1, 2 driven through bevel gears 4, 5 and 6, 7 by a shaft 3 driven in turn through bevel gears 9, 10 by another shaft 8 rotating at a velocity proportional to the ordinates determined in a two-co-ordinate reference system by a mechanical computer, such as that described in the aforesaid U. S. Patent No. 2,507,567. Screw sockets 11, 12 mounted on screw rods 1, 2 are interconnected through a bridge member 13 carrying another screw rod 14 perpendicular to screws 1, 2. This other screw rod 14 is driven by bevel gears 15, 16 driven in turn by a shaft 17 which is splined for allowing the displacement of bevel gears 16 when bridge member 13 is displaced; the rotational speed of said shaft 17 is a function of the abscissae determined in the hereinabove indicated two-co-ordinate system. The screw socket 18 which is driven by screw rod 14 is provided with a pin 19 which is therefore movable in the whole plane, its position representing that of the airplane, then the screw socket 18 occupies a position resulting from the geometrical summation of quantities proportional to the co-ordinates of the airplane in the aforementioned two-co-ordinate system. An alidade 20 (see Figs. 2 and 3) is pivotally mounted above this mechanism about the axis of its pin 21 which is pivotally mounted on the dial 21a of the device at the center of the field and represents the origin of the co-ordinates. This alidade 20 is provided with a slider 22 formed with a hole 22a adapted to receive the aforesaid pin 19 (Figs. 2 and 3). As a result of this arrangement the alidade is constantly oriented in a direction $\omega$ relative to that of screw rods 1, 2 corresponding to the north while the distance existing between the center of hole 22a and the axis of pin 21 is proportional to $\rho$. The angle $\omega$ is transmitted to an azimuth index 26 through a wheel 23 secured on pin 21 and driving wheels 24 and 25, these wheels rotating in the direction $+\omega$, $-\omega$ and $+\omega$ respectively.

Besides, the slider 22 carries laterally a rack member 27 meshing with a toothed wheel 28 mounted for loose rotation about the fixed pin 21 (Figs. 2 and 3). Thus, wheel 28 rotates through an angle $\gamma$ proportional to $\varphi$ in relation to the alidade but also proportional to $(\gamma+\omega)$ in relation to the whole of the apparatus. This rotation $(\gamma+\omega)$ is transmitted through a wheel 29a to one sun wheel 29 of a differential the other sun wheel 33 of which is rotatably driven by wheel 23 in a direction $-\omega$. As a result, the carrier 34 of the planet pinions 35 of this differential has a rotation $\gamma$ transmitted through the shaft 36 to an index 30 (Figs. 2 and 4) movable in front of a dial graduated in units of length such as miles or kilometers.

On taking-off, as the pin 19 is placed at the center and registers with the pivot pin 21 of the alidade 20, this pin 19 would most probably be held against motion from the very beginning if this alidade were not oriented at this moment in the direction in which the movement tends to occur. It is therefore necessary, before taking-off, to make sure that the azimuth index is properly brought to the azimuth position corresponding to the approximate direction of the course to be followed. The resiliency of the parts controlling the displacement of the pin will be sufficient to absorb any low-amplitude movements resulting from the evolutions of the airplane above its starting base.

Figure 4:
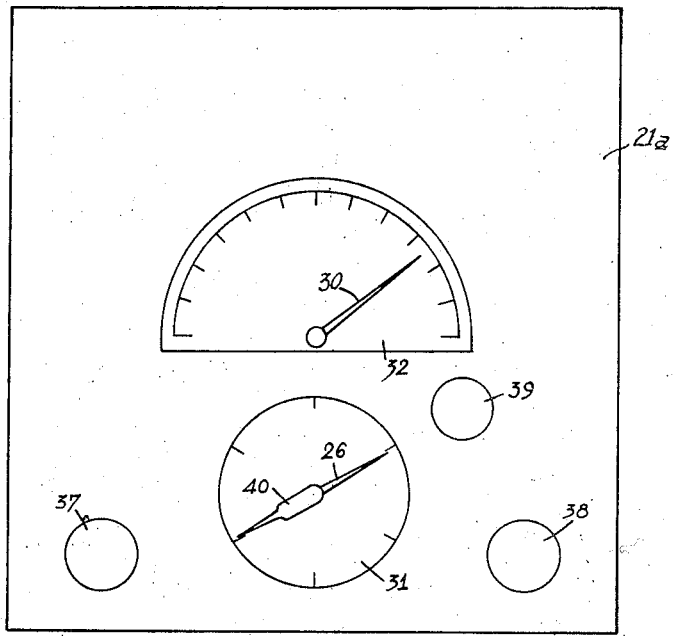
Fig. 4 is a front view of the dial panel of the device.

The dials may be arranged as illustrated in Fig. 4 showing the dial 31 of the azimuth $\omega$ associated with the index 26, and the dial 32 of the polar radiuses $\rho$ associated with the index 30.

The mechanical device described above operates as follows:

(a) Before starting, the distance index 30 is set to zero by acting by turns upon knobs 37, 38, the former controlling the parallel screw rods 1, 2 and the latter the cross screw rod 14 through gears, not illustrated and immaterial with the invention, said gears acting on shafts 8 and 17. Then, by actuating the control knob 39 the azimuth index 26 is caused to register with the graduation line corresponding to the course to be followed, regardless of the take-off direction. As a result, the various members of the position indicator are set in view of the mechanical calculus to be effected thereby.

(b) During the flight and if necessary elements $\omega$ and $\rho$ represented by indices 26, 30 give the position of the airplane relative to the ground.

(c) For the return flight, the course $\omega+180°$ indicated by the thicker portion 40 of the azimuth index 26 is adopted and the airplane is flown in maintaining $\omega$ constant until the distance index 30 is reset to the zero position.

Figure 5:
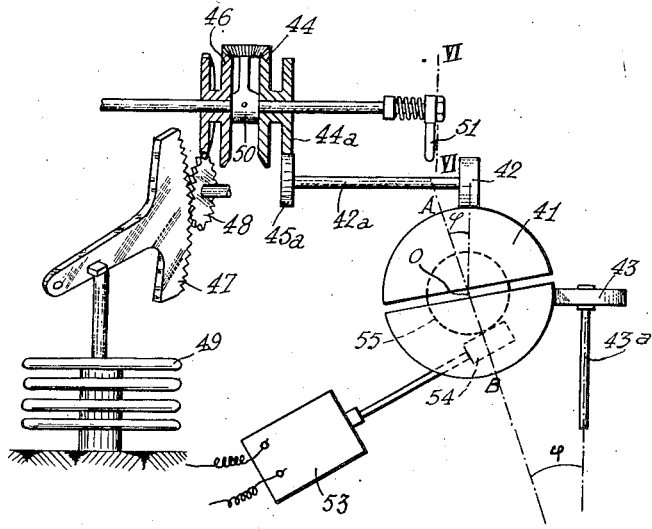
Fig. 5 is a diagrammatical view of the speed transformer according to this invention.
Figure 6:
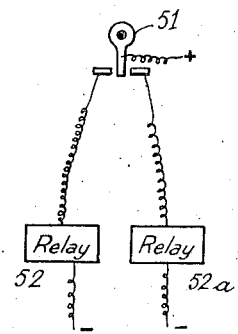
Fig. 6 is a fragmentary cross-section along the line VI—VI of Fig. 5.

The speed transformer illustrated in Figs. 5 and 6 comprises a sphere 41 rotating about its diameter AB at a speed proportional to the speed V of the airplane along its course. For this purpose said sphere 41 is organized as the sphere illustrated in Fig. 3 of the aforesaid U. S. Patent No. 2,517,567, its rotation axis being mechanically coupled to the part of the servo-anemometer which transmits to the speed transformer a movement having a velocity proportional to V. This sphere is associated with a pair of roller wheels 42, 43 tangent with the sphere at two points forming an angle of 90° with the center of the sphere.

Assuming $\varphi$ to be the angle between the radius from the point in which the roller wheel 42 contacts the sphere and the axis AB of this sphere, roller wheel 42 will rotate through $V \sin \varphi$ and roller wheel 43 through $V \cos \varphi$. If $\varphi$ is equal to the inclination $\phi$ of the course, roller wheels 42, 43 will record the vertical and horizontal velocities of the airplane respectively.

The angle $\phi$ is unknown, but if the direction of axis AB is so adjusted that roller wheel 42 will be rotated in proportion with the vertical speed, roller wheel 43 will then rotate in proportion with the horizontal speed to be determined.

For this purpose and according to this invention a differential is used having a sun gear 44 fast with a toothed wheel 44a driven by a pinion 45a fast with the shaft 42a of roller wheel 42. The other sun gear 46 of the differential is acted upon in the opposite direction through the medium, for instance, of a toothed sector 47 meshing with a transmission pinion 48 and controlled by the suitably amplified expansion of an altimetric diaphragm 49. Under these conditions, the differential planet pinion carrier 50 is held against motion if $\varphi=\phi$, but its central shaft rotates in one or another direction if these angles are unequal. The movable armature 51 of a contactor, mounted in light frictional engagement on this shaft and tending to rotate therewith, will then energize either of a pair of relays 52 or 52a adapted to reverse the direction of rotation of a motor 53 driving the carrier member of sphere 41 about axis O in the direction adapted to cause the axis AB to incline with respect to the axis of roller wheel 42 by an angle equal to the complement of the inclination of the aircraft course with respect to the horizontal, whereby said axis corresponds to the real inclination of the course followed. Motor 53 is connected to sphere 41 by means of a worm gear 54 meshing with a pinion 55 similar to the pinion 6a of the embodiment illustrated in Fig. 3 of the aforesaid U. S. Patent No. 2,507,567. Then, roller wheel 43 rotates to the extent of $V \cos \phi$ and totalizes the horizontal travel of the airplane. The computer of the orthogonal co-ordinates is actuated by the shaft 43a of this roller wheel 43 by means of a connection similar to that described in the aforesaid U. S. Patent No. 2,507,567 in relation with its Figs. 6 and 12.

In Fig. 7, A represents a movement having a speed V proportional with the tangential speed of an aircraft; B represents a movement having a speed proportional with $V_H$; C represents a movement having a speed equal to $V \cos \alpha + v \cos \beta$; D represents a constant speed used for determining a movement having a speed proportional with the speed $v$ of the wind; and E represents a movement having a speed equal to $V \sin \alpha + v \sin \beta$.

As shown in Fig. 7, the computer system comprises a servo-anemometer such as that described in U. S. Patent No. 2,537,580 which can produce, on one hand, a movement having a speed V proportional with the tangential speed of the moving body and, on the other hand, a constant speed used for determining a movement having a speed proportional with the speed $v$ of the wind; a speed transformer for measuring the horizontal component $V_H$ of speed $V$ producing a movement having a speed proportional with said component $V_H$; a computer for determining the position of the moving body in an orthogonal two-co-ordinate reference system, such that described in the U. S. Patent No. 2,507,567, said computer receiving the movement having a speed proportional to $V_H$ and the movement having a constant speed, said computer, further, producing a movement having a speed equal to $V \cos \alpha + v \cos \beta$ and, on the other hand, a movement having a speed equal to $V \sin \alpha + v \sin \beta$; and a transformer for converting orthogonal co-ordinates into polar co-ordinates, said transformer receiving the movements produced by said computer.

What I claim is:

1. In a device for determining the position reached from its starting base by an aircraft adapted to be flown along very steep courses in relation to the horizontal and more particularly by a single-seater interceptor-fighter, said device comprising devices respectively measuring the instantaneous air velocity $V$ of the aircraft, the wind velocity $v$ relative to the ground, the track angle of said aircraft and the wind direction with respect to the northern direction, and a computer continuously receiving the indications of said devices with a view to transform the same for, on the one hand, determining, in a horizontal rectangular two-co-ordinate reference system, the respective sums of the components of $V$ and $v$ in relation to the axes of said system, and, on the other hand, generating two rotational movements the speeds of which are respectively proportional to said sums; the improvement which comprises an assembly for measuring the horizontal component $V_H$ of the speed $V$, said assembly being inserted between the computer and the device indicating said speed $V$, whereby said computer delivers two movements proportional to the sums of the components of the speeds $V_H$ and $v$ with respect to the rectangular axes of the horizontal rectangular reference system, a member displaceable in the horizontal reference plane, means for operatively connecting said member with said computer so that said member is simultaneously displaced in said horizontal reference plane under the action of said both movements, whereby one predetermined point of said member which represents the aircraft moves in said horizontal reference plane in the direction of the resultant of said speeds $V_H$ and $v$ at a velocity proportional to the magnitude of said resultant, means for transforming the rectangular co-ordinates of said point in said rectangular reference system into polar co-ordinates with respect to the fixed center of the co-ordinates which represents the starting base of the aircraft and a fixed direction passing through said center and parallel to the northern direction, and means for indicating said polar co-ordinates.

2. Device, according to claim 1, wherein the assembly for measuring the horizontal component $V_H$ of the aircraft speed $V$ comprises a device adapted to multiply said speed $V$ by the sine of any angle whatever, and a means for varying said angle in proportion with the vertical speed of said aircraft in order to bring said angle into coincidence with the angle made by said speed $V$ with the horizontal plane.

3. Device, according to claim 1, wherein the assembly for measuring the horizontal component $V_H$ of the speed $V$ of the aircraft comprises a driving sphere adapted to rotate about a diametral axis at a speed proportional with the instantaneous speed $V$ of said aircraft, a pair of rotary devices disposed tangentially to said sphere and adapted to rotate about axes perpendicular to each other, parallel with the plane of tangency to said sphere and situated in a common plane with the axis of rotation of said sphere, a means for inclining the axis of rotation of said sphere in said common plane by an angle equal to the complement of the inclination of the aircraft course on the horizontal in relation to the axis of rotation of one of said rotary devices, and a means for acting upon said inclining means in proportion with the vertical speed of said aircraft.

4. Device, according to claim 3, wherein said inclining means and said means for acting upon said inclining means comprise a toothed wheel rotatably fast with the shaft of one of said rotary devices, an altimetric diaphragm, means for amplifying the movements of said altimetric diaphragm, a first differential device having a sun gear meshing with said toothed wheel, another sun gear actuated by said amplifying means, a train of planet pinions meshing with said first and second sun gears, a carrier member supporting said planet pinions, and a current reversing device connected across the supply circuit to the motor provided for driving said sphere, said reversing device having a movable armature operatively connected with said carrier member and driven thereby so as to energize said motor in either one or the other direction in view of causing the angle between the axis of rotation of said sphere and the axis of tangency of the rotary device associated with said toothed wheel to register with the angle formed by the course followed by said aircraft with respect to the horizontal, whereby the other rotary device will rotate proportionally to the horizontal component $V_H$ of the speed $V$.

5. A device, according to claim 1, wherein the means for transforming the rectangular co-ordinates of the point pertaining to the displaceable member and which represents the aircraft into polar co-ordinates comprises a pivot pin perpendicular to the horizontal reference plane, secured on the displaceable member and the axis of which passes through said point, a screw socket formed integrally with said displaceable member, a screw rod engaged by said screw socket for axial motion therealong, a shaft receiving from the computer a rotational speed proportional to the component of $(V_H+v)$ with respect to one of the rectangular axes and connecting said computer with said screw rod, a bridge member parallel to and supporting said screw rod, a pair of screw sockets fast with either ends of said bridge member respectively and directed at right angles to said screw rod, a pair of screw rods perpendicular to said first screw rod and engaged by said pair of screw sockets respectively for axial motion therealong, a shaft receiving from the computer a rotational speed proportional to the component of $(V_H+v)$ with respect to the other rectangular axis and connecting said computer to the screw rods of said pair, a rotary pivot passing through the center of the co-ordinates, an alidade fast with said pivot, and a slider slidably mounted on said alidade and fulcrumed on the pivot pin of the displaceable member, whereby said alidade is constantly pointing to the azimuth of the actual position of said aircraft with respect to the northern direction while the distance existing between the axes of said rotary pivot and of said pivot pin is proportional to the actual distance of said aircraft from its starting base.

6. A device, according to claim 5, wherein the slider is formed with a rack and wherein the means for indicating the polar co-ordinates comprises a first toothed wheel fixed on the pivot pin, a second toothed wheel mounted for loose rotation on said pivot pin and engaging said rack, a first intermediate toothed wheel driven by said loose wheel, a differential comprising a first sun gear meshing with said first intermediate wheel, another sun gear meshing with said first toothed wheel, planet pinions meshing with said first and second sun gears, and a planet pinion carrier member, a shaft fast with said planet pinion carrier member, an index fast with said shaft, a dial graduated in units of length and in front of which said index moves, a second intermediate toothed wheel meshing with the first toothed wheel, a third toothed wheel meshing with said second intermediate toothed wheel, an index fast with the shaft of said third toothed wheel and a dial graduated in azimuths and in front of which said last index moves.

References Cited in the file of this patent

UNITED STATES PATENTS

| | | |
|---|---|---|
| 1,592,553 | Brewerton | July 13, 1926 |
| 1,854,391 | Avery | Apr. 19, 1932 |
| 1,985,266 | Smith et al. | Dec. 25, 1934 |
| 2,116,508 | Colvin | May 10, 1938 |
| 2,340,865 | Chaffee et al. | Feb. 8, 1944 |
| 2,544,587 | Cloud | Mar. 6, 1951 |
| 2,567,984 | Wood | Sept. 18, 1951 |
| 2,609,729 | Wilkinson et al. | Sept. 9, 1952 |

FOREIGN PATENTS

| | | |
|---|---|---|
| 188,527 | Great Britain | Nov. 16, 1922 |
| 664,769 | France | Apr. 29, 1929 |